United States Patent [19]

Kramer et al.

[11] Patent Number: 5,335,291
[45] Date of Patent: Aug. 2, 1994

[54] METHOD AND APPARATUS FOR PATTERN MAPPING SYSTEM WITH SELF-RELIABILITY CHECK

[75] Inventors: Mark A. Kramer, Winchester; James A. Leonard, Cambridge, both of Mass.; Lyle H. Ungar, Philadelphia, Pa.

[73] Assignee: Massachusetts Institute of Technology, Cambridge, Mass.

[21] Appl. No.: 165,067

[22] Filed: Dec. 9, 1993

Related U.S. Application Data

[63] Continuation of Ser. No. 763,378, Sep. 20, 1991, abandoned.

[51] Int. Cl.$^5$ ............................................. G06K 9/62
[52] U.S. Cl. ......................................... 382/14; 382/57; 395/21
[58] Field of Search ............... 382/14, 15, 57; 395/21, 395/22, 23, 50, 51, 55

[56] References Cited

U.S. PATENT DOCUMENTS

| | | | |
|---|---|---|---|
| 4,593,367 | 6/1986 | Slack et al. | 364/513 |
| 4,599,692 | 7/1986 | Tan et al. | 364/513 |
| 4,599,693 | 7/1986 | Denenberg | 364/513 |
| 5,052,043 | 9/1991 | Gaborski | 382/14 |
| 5,119,468 | 6/1992 | Owens | 395/22 |

FOREIGN PATENT DOCUMENTS 2-242392  9/1990  Japan ..................... 382/14

OTHER PUBLICATIONS

Donald F. Specht, "Probabilistic Neural Networks," *Neural Networks* (1990), vol. 3, pp. 109-118.

A. Mucciardi et al., "An Automatic Clustering Algorithm and Its Properties in High-Dimensional Spaces," IEEE Transactions on Systems, Man, and *Cybernetics* (Apr. 1972), vol. SMC-2, No. 2, pp. 247-254.

Barron et al., "Adaptive Learning Networks: Development and Application in the United States of Algorithms Related to GMDH," *Self Organizing Methods in Modeling GMDH Type Algorithms* (1984), S. J. Farlow, ed., Chapter 2, pp. 25-65.

Wetherill et al., *Regression Analysis with Applications* (1986), Chapman and Hall Publisher, pp. 138-147 and pp. 215-229.

Weiss et al., *Computer Systems That Learn* (1991), Morgan Kaufmann Publishers, Inc., pp. 17-49.

Leonard et al., "Radial Basis Function Networks for Classifying Process Faults," *IEEE Control Systems* (Apr. 1991), vol. 11, pp. 31-38.

Leonard et al., "A Neural Network Architecture that Computes Its Own Reliability," presented at the Fifth Annual Symposium LISPE-Industrial Consortium, May 20-22, 1991, pp. JL1-JL23.

"Fast Learning in Networks of Locally-Tuned Processing Units", J. Moody and C. Darken, *Neural Computation*, 1989 vol. 1, pp. 281-294.

"A Neural Network Approach to Statistical Pattern Classification by 'Semiparametric' Estimation of Probability Density Functions", H. Traven, *IEEE Transactions on Neural Networks* May 1991, vol. 2. No. 3, pp. 366-377.

*Primary Examiner*—David K. Moore
*Assistant Examiner*—Andrew W. Johns
*Attorney, Agent, or Firm*—Hamilton, Brook, Smith & Reynolds

[57] ABSTRACT

A pattern mapping system provides indication of reliability of pattern or category selection indicated by output nodes. The indication of reliability includes a quantitative indication of error in the output and an indication when training is insufficient for the system to respond to the input pattern accurately. The error indication is based on error in the outputs produced by the system as trained in response to given inputs, and accuracy of fit of training data to the output. The insufficiency of the mapping system as trained is determined according to training data density local to the subject input pattern.

19 Claims, 13 Drawing Sheets

METHOD AND APPARATUS FOR PATTERN MAPPING SYSTEM WITH SELF-RELIABILITY CHECK

GOVERNMENT SUPPORT

This research was supported in part by the National Science Foundation (NSF CTS8814226).

This is a continuation of co-pending application Ser. No. 07/763,378 filed on Sep. 20, 1991, now abandoned.

BACKGROUND OF THE INVENTION

A "neural network" (also called a connectionist model) is generally an electronic system (usually implemented in software but may be a combination of hardware and software) for modeling or simulating the brain. Typically neural networks are specified by describing the four attributes of architecture, propagation rules/equations, activation rules/equations and learning rules/equations.

The architecture attribute specifies the organization of neurons or nodes (the fundamental processing element or unit of a neural network) into clusters, clusters into layers, and layers into the overall neural network. For many neural networks, clusters are not used; hence, the neurons are organized directly into layers. In addition, layers may be arranged in a hierarchy. To that end, the architecture attribute also describes the "permitted" flow of information or signals within the neural network by specifying actual (or rules for) physical (specific) and broadcast (non-specific) connectivity paths between layers, clusters, and/or neurons (nodes).

Propagation rules/equations provide a detailed description, usually mathematical, of information/signal flow for every permitted physical and broadcast connectivity path specified in the architecture. This includes initial conditions and evolution over time.

Activation rules/equations provide a detailed description, usually mathematical, of how each neuron specified in the architecture processes its information (signals) to produce output information (signals). This includes initial conditions and evolution over time. In a so called "winner take all" activation, for a given set of inputs to the network neurons, one and only one neuron outputs a logical one and all other neurons output a zero. In a "many-to-many" activation, several of the network neurons generate a non-zero output.

Through learning, a neural network is trained so that application of a vector or set of inputs produces the desired (or at least consistent) set of outputs. Both output sets as well as inputs sets are referred to as vectors. Learning is usually accomplished by sequentially applying input vectors, while adjusting network internal parameters according to the learning rules/equations. During learning, the network parameters gradually converge to values that enable each input vector to produce the desired output vector. Learning is said to be either "supervised" where there is an external teacher that evaluates behavior of the network and directs weight definitions accordingly, or "unsupervised" where there is no teacher and the network self-organizes.

As such, neural networks trained by supervised training are commonly used to capture input-output functions (i.e., a pattern mapping of input patterns to output patterns). Two such applications include pattern recognition where a classification of patterns is learned and functional approximation where representations of continuous functions are learned. Whenever an input-output functionality is achieved, there is a question of reliability. The reliability of a neural network is determined by two factors: whether or not the network is being applied in a domain of the independent variables where training data were available (extrapolation), and the accuracy of the network mapping for given values of the independent variables (local goodness of fit). Measures of extrapolation and local goodness of fit have not yet been defined in the context of neural networks. Because neural networks do not automatically flag when they are extrapolating from the training data, users may inadvertently use an invalid prediction (network output). In addition, outputs of conventional neural networks do not carry explicit error bars, so the user has only a rough idea of the accuracy of a given prediction (network output).

The simplest treatment of extrapolation involves placing individual upper and lower bounds on the permissible range of each independent variable. This approach will frequently overestimate the region of validity of the network output since it assumes the independent variables have zero covariance. Any correlated distribution of the independent variables will result in underpopulated areas within the hyper-rectangle defined by the upper and lower bounds. Correlations among the independent variables can be accounted for by the Mahalanobis distance which measures the distance from a test point to the centroid of the training data scaled by the variance in the direction to the centroid. See R. O. Duda and P. E. Hart, *Pattern Analysis and Scene Classification*, Wiley Interscience, New York (1973). Strictly, the Mahalanobis distance is only appropriate if the independent variables follow a multivariate Gaussian distribution, and it is particularly poor at handling skewed and multi-modal distributions.

Another possible definition of extrapolation in multiple dimensions is based on the convex hull of the training data. The convex hull is the minimum volume polyhedron circumscribing the training points. See D. R. Chand and S. S. Kapur, "An Algorithm for Convex Polytopes," *Journal of ACM*, vol. 17, pgs. 78–86 (1978). However, if there are nonconvexities, regions inside the convex hull may be void of training data.

The second factor affecting neural network reliability is the accuracy of the network when the network is not extrapolating. Conventional techniques for training neural networks use only global measures of goodness of fit, usually in terms of the sum of squared errors (target-network output) over the training examples, a similar error measure on a test set, or percentage misclassification in pattern recognition. However, the accuracy of the network may vary over the input space because the training data are not uniformly distributed or the noise in the dependent variables is not constant. In these cases, local regions of poor fit may not be strongly reflected in the global measures of prediction error.

Accordingly, there is a need for techniques to determine reliability of a neural network. In particular, there is a need for analyzing and treating extrapolation and accuracy of a neural network.

SUMMARY OF THE INVENTION

The present invention provides a solution to the prior art problems regarding reliability of a neural network. In particular, the present invention provides a neural network or pattern mapping system with outputs, in addition to outputs for which the system was trained, that indicate extrapolation and a measure of local goodness of fit.

As for extrapolation, instead of assuming a specific distribution or convexity, the present invention implements a non-parametric, non-convex method of determining where there is sufficient training data for reliable neural network predictions (output). Extrapolation in this context is defined as any local region of the input space with little or no training data to support a neural network prediction. Thus extrapolation is linked to the estimation of local training data density, and extrapolation is declared when the local density of training points falls below a certain threshold. In pattern classification applications, the same indicator is used to detect novel cases not adequately represented by the training data, provided the inputs to the classifier are real-valued.

The local goodness of fit measure is expressed as a confidence interval on each network prediction or output. Because the uncertainty associated with network predictions can vary from one area of the independent variable space to another, a new confidence interval is calculated with each new neural network prediction (output).

In a preferred embodiment an improvement is provided to a pattern mapping system (e.g., a pattern classification or functional approximation system) of the type having (i) an input layer for presenting an input pattern, (ii) a working layer of nodes connected to the input layer for receiving the input pattern and activating an output pattern indicative of the input pattern in accordance with predefined training parameters including training data, and (iii) output nodes coupled to the working layer for providing an output of the output pattern. The improvement couples a node assembly to the working layer for providing an indication of reliability of the output pattern, and in particular reliability of the system in the subject application as trained. That is, reliability is provided in part as a function of the training parameters and in part as a function of the input pattern to which the system as trained is being applied.

In another embodiment, a pattern mapping system of the present invention employs (a) input nodes, (b) a layer of working nodes, (c) a plurality of output nodes, and (d) an output assembly. The input nodes define an input pattern. The layer of working nodes are coupled to the input nodes. Each working node corresponds to a different range of target patterns from training data, and responds to input patterns within the corresponding range of target patterns by producing a respective activation signal. The plurality of output nodes is coupled to receive and sum the activation signals of the working nodes, and therefrom provides an output pattern indicative of the input pattern. The present invention output assembly is coupled to receive the activation signals from the working nodes, and provides at least one measure of reliability of the output pattern as a function of the training data.

In accordance with one aspect of the present invention, the output or node assembly includes at least a first node for indicating when the predefined training parameters or training data on which the mapping system is trained is insufficient for the system to appropriately or correctly respond to the given input data. In particular, the first node provides a measure of the amount of training data local to the input pattern, i.e. involved in the ranges of target patterns of the working nodes producing activation signals in response to the input pattern. An amount of local training data falling below a predetermined threshold, results in an insufficiency to appropriately or correctly respond to the input pattern. The amount of local training data may be indicated as training data density.

A second node (and possibly subsequent nodes) in the output or node assembly provides a measure of accuracy of fit of the output pattern to the local training data. That is, the second node provides a quantitative indication of error in the output pattern, and in particular, error as a function of the given input patterns and the trained mapping system (i.e., based on error in the outputs in response to given inputs of the working nodes as established by the training parameters). The error may be indicated as a range of uncertainty of the output pattern.

According to another aspect of the present invention, the second node employs a ratio node. The ratio node calculates the expected error in the output pattern of the mapping system by averaging the contributions of the working nodes to the output error weighted by activations of the working node for the given input pattern.

Further, the output or node assembly comprises plural summing nodes coupled between the layer of working nodes and the first and second nodes of the assembly. One summing node is common to the first and second nodes. In addition, a maximum activation node indicating maximum activation of the working nodes is employed.

Preferably the working nodes are radial basis function units which have respective activation signals defined according to a Gaussian density function. Also, when the output nodes identify category of the input pattern, the pattern mapping system serves as a pattern classification system having reliability measures that indicate sufficiency of the mapping system trained on the training data. Similarly, when the output nodes provide a functional mapping of the input pattern, the pattern mapping system serves as a functional approximation system having reliability measures.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1:
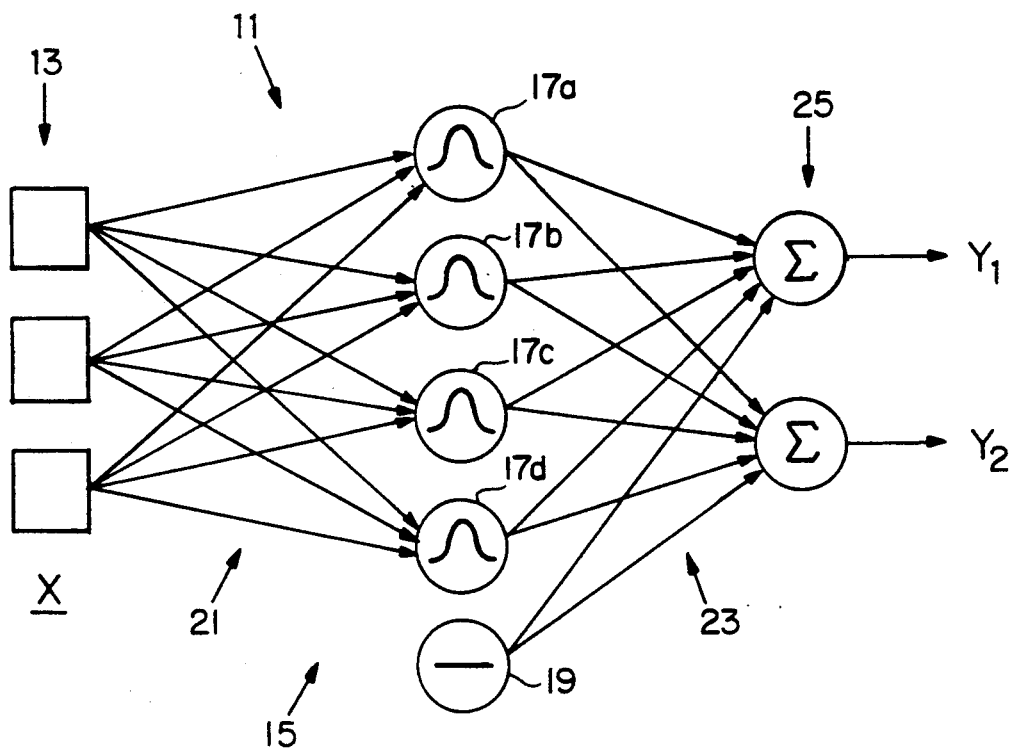
FIG. 1 is a schematic diagram of a typical Radial Basis Function neural network.

By way of background, Applicants have discovered that to judge the reliability of a neural network model, one needs an estimate of how much training data is "local" to a given model prediction (output) and how well that local training data is fit by the model (neural network). Training data is considered "local" to a test point if it is within a limited region (neighborhood) around the test point. The question of how much, if any, training data is in a given neighborhood is a function of the independent variables only. Only one measure of the distribution of the data in the independent variable space is needed to detect extrapolation regardless of how many inputs or outputs the neural network has. In order to indicate the accuracy or uncertainty associated with the model predictions (network outputs), however, a separate measure is needed for each output, since different dependent variables may be fit with different accuracy. Therefore, a neural network model with (nominally) M outputs will require M+1 additional output nodes to indicate the reliability of the model predictions: M estimates of the accuracy of each model prediction, and one estimate of the amount of training data contributing to the predictions.

The definition of "local", the size of the neighborhoods, is crucial. If the neighborhoods are too small, they will not contain enough data to estimate the model accuracy and the test for extrapolation/lack of data will be overly sensitive. On the other hand, if the neighborhood is too large, the local variations in accuracy will be missed and the test for extrapolation/lack of data will be insensitive. In the extreme case of one large neighborhood one should regain the global results, namely a global goodness of fit and no ability to detect extrapolation. While in general the definition of neighborhood size appears to be a somewhat arbitrary feature of this approach, for Radial Basis Function neural networks (RBFNs) the concept of a local neighborhood is naturally well defined. RBFNs partition the training data into local clusters and limit the distance over which data may influence the model prediction (network output). RBFN outputs are essentially a composition of multiple, overlapping, local fits to the training data. Therefore, RBFNs provide the basic framework for development of the preferred embodiment of the present invention.

RBFNs have been used for many applications including phoneme classification (see S. Renals and R. Rohwer, "Phoneme Classification Experiments Using Radial Basis Functions," *Proc. Intl. Joint Conf. Neural Networks*, pgs. 461–467, 1989), fault diagnosis problems in chemical processes (see S. C. Yao and E. Zafiriou, "Control System Sensor Failure Detection via Networks of Localized Receptive Fields," *Proc. Amer. Control Conf.*, San Diego, Calif., 1990; and J. A. Leonard and M. A. Kramer, "Radial Basis Function Networks for Classifying Process Faults," *IEEE Control Systems Magazine*, vol. 11, pgs 31–38, 1991), and process control (see K. Parthasarathy and K. S. Narendra, "Identification and Control of Dynamical Systems Using Neural Networks," *IEEE Trans. Neural Networks*, vol. 1, pgs 4–27, 1990). Unlike backpropagation neural networks (BPNs), RBFNs use a distance metric in the input space to determine the hidden layer activations (discussed later). As a result, the contours of constant activation of the hidden layer are hyperspheres instead of hyperplanes as with BPNs. The contours are finite in length and form closed regions of significant activation, as opposed to BPNs where the contours are infinite in length and form semi-infinite regions of significant activation. This feature of RBFNs is exploited to produce local reliability measures in the preferred embodiment of the present invention.

Illustrated in FIG. 1 is a schematic diagram of a basic RBFN 11. The radial basis function network 11 is generally formed of three layers of nodes with each successive layer exhaustively interconnected to the preceding layer by feedforward arcs. The first layer (input layer 13) provides N input nodes which carry input signals x representative of a subject input pattern. Unweighted connections 21 implement a fanout of the input signals to the second or so-called hidden layer 15. Because these connections 21 are not weighted as in BPNs, the input to each working node in hidden layer 15 is the input vector, x.

The hidden layer 15 consists of H working nodes 17 (also known as radial units) plus a bias node 19 which has a constant activation of one. Each working node 17 has N+1 internal parameters: $x_h$, the position of the center of the radial unit (working node) in the feature space; and $\sigma$, a distance scaling parameter known as the unit width which determines over what distance in the input space the unit will have a significant influence. The parameter $\sigma$ has the same function as the standard deviation in the standard normal probability distribution, although it is not estimated in the same way. Working nodes 17 respond to input vector x according to a transfer function similar to the multivariate Gaussian density function, $$a_h = \exp(-||x-x_h||^2/\sigma_h^2) \quad (1)$$

where $a_h$ is the output of unit h (working node h) in the hidden layer 15 given the input x. According to Equation (1) each working node 17 has a significant activation over a specific region determined by $x_h$ and $\sigma_h$, thus each working node 17 represents a unique local neighborhood in the input space.

Connections 23 between the second (hidden) layer 15 and output nodes 25 of the RBFN 11 are weighted in the usual neural network manner, and the output nodes 25 of the RBFN 11 are linear summation units. The value of the i-th output node $y_i$ is given by:

$$y_i = \sum_{h=1}^{H+1} w_{hi} a_h \quad (2)$$

where $w_{hi}$ is the weight of connection 23 between working node h and output node $y_i$. The bias node 19 is represented as $a_{H+1}=1$.

RBFN 11 of FIG. 1 is trained by the method of J. Moody and C. J. Darken, "Fast Learning in Networks of Locally Tuned Processing Units," *Neural Computation*, vol. 1, pgs 281–294 (1989), incorporated herein by reference. This method trains RBFNs in three sequential stages. The first stage consists of determining the working node 17 centers $x_h$ by the k-means clustering algorithm (see J. MacQueen, "Some Methods for Classification and Analysis of Multivariate Observations," in *Proc. Fifth Berkeley Symp. Math. Stat. and Prob.*, L. M. Cain and J. Neymen, Eds., Berkeley, Calif., U. C. Berkeley Press, pgs. 281–294, 1967), an unsupervised technique that places working node centers centrally among clusters of training points. Next the unit (working node) widths $\sigma_h$ are determined using a nearest neighbor heuristic that ensures the smoothness and continuity of the fitted function. The width of any hidden layer unit 17 is taken as the RMS (square root of the mean square) distance to the P nearest unit centers, where P is a design parameter. Finally the weights $w_{hi}$ of the connections 23 are determined by linear regression, and in particular linear least squares. The objective function to be minimized is the RMS error between network output and training targets.

It is understood that variations on RBFN architecture and training are possible (see T. Holcomb & M. Morari, "Local Training for Radial Basis Function Networks: Towards Solving the Hidden Unit Problem," *Proc. Amer. Control Conf.*, pgs 2331-2336, 1991; P. A. Jokinen, "Continuously Learning Nonlinear Networks with Dynamic Capacity Allocation," Ph. D. Thesis, Tampere Univ. of Tech., Finland, 1991; J. Platt, "A Resource Allocating Network for Function Interpolation," *Neural Computation*, vol. 3, pgs. 213-225, 1991; and T. D. Sanger, "A Tree-Structured Algorithm for Reducing Computation in Networks with Separable Basis Functions," *Neural Computation*, vol. 3, pgs. 67-78, 1991). Variations include replacing the RBF hyperspheres with hyperellipses, optimizing unit centers and/or widths by backpropagation training, using sequential allocation of unit centers, etc. Although the following discussion focuses attention to the network architecture and training method just described, it is understood that the concepts for reliability prediction of the present invention may be extendable to other variations on RBFNs, as well as neural networks of other architectures.

Figure 2:
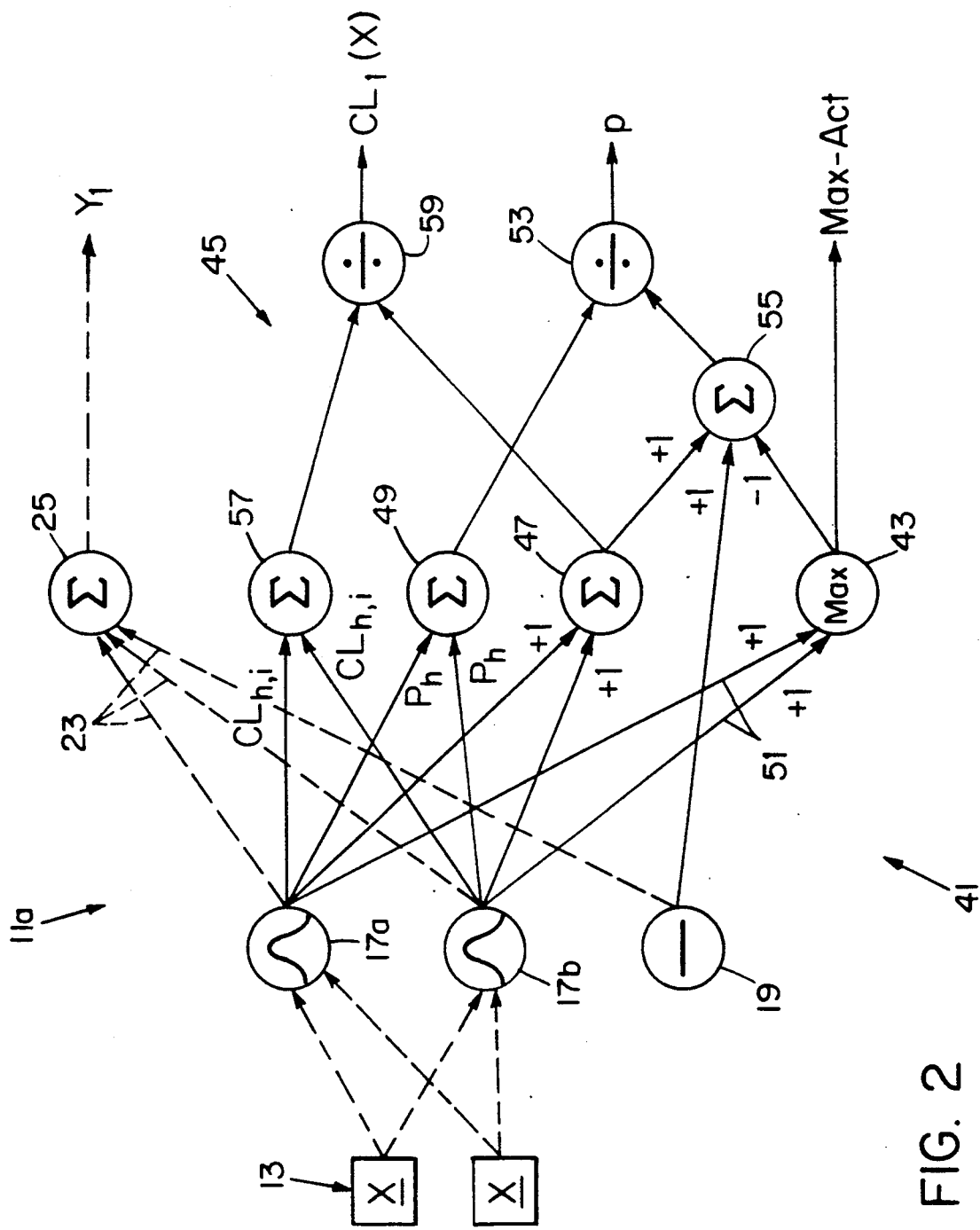
FIG. 2 is a schematic diagram of the present invention implemented in the network of FIG. 1.

The RBFN 11 of FIG. 1 forms the basis of the preferred embodiment of the present invention shown in FIG. 2. Specifically, RBFN 11 of FIG. 1 is appropriately structured and trained to form an underlying RBFN 11a (indicated in dash lines in FIG. 2), and an output node assembly 45 (detailed later) for providing reliability measures in accordance with the present invention is added to the underlying RBFN 11a to form the present invention network 41 of FIG. 2. The steps taken to produce the present invention network 41 of FIG. 2 from the RBFN 11 of FIG. 1 are summarized as follows and discussed in detail next.

Figure 3:
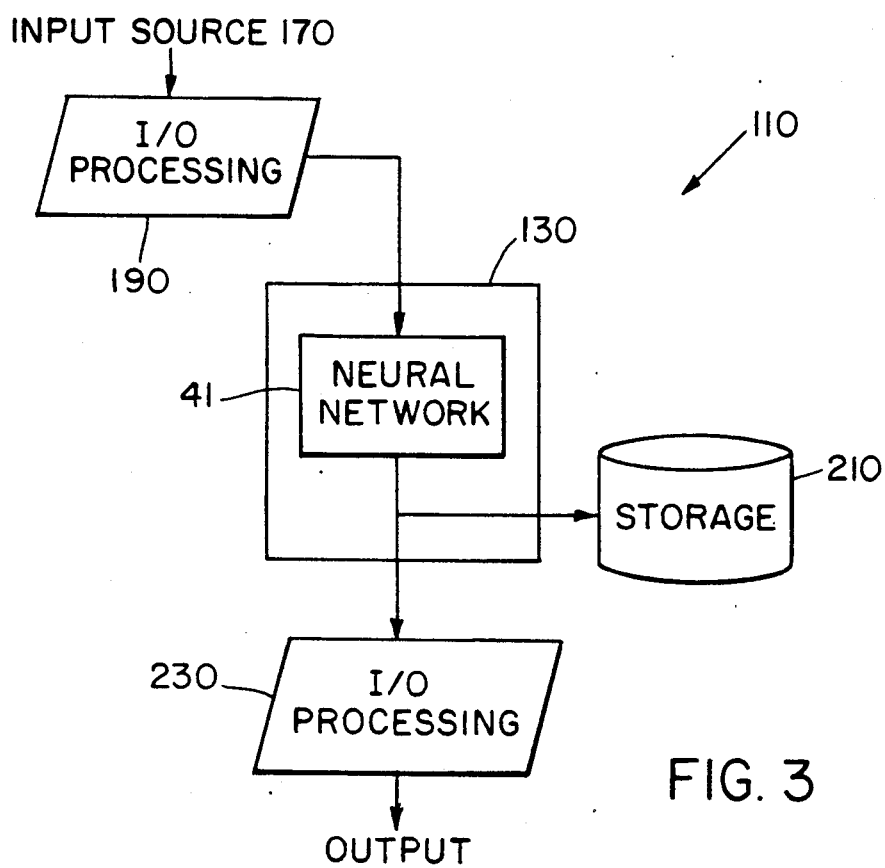
FIG. 3 is a block diagram of computer system support for a neural network of the present invention.

In general, the method for forming the present invention network 41 (FIG. 2) from the RBFN 11 of FIG. 1 involves the four steps of:
 (i) Training the network 11;
 (ii) For the trained network, obtain some measure of error associated with each training point. In particular, calculate the prediction error $E_{ik}$ which is defined as the absolute value of the difference between the output (or prediction) of the network and supervised (or desired) training targets. Thus $E_{ik}$ is a measure of how well the trained network predicts the supervised training targets.
 (iii) For the trained network, calculate $n_h$, $V_h$, $\rho_h$ (or $\omega_h$), $s^2_{hi}$, and $CL_{hi}$ (or $CL'_{hi}$) each defined later; and
 (iv) Augmenting the network as shown in FIG. 3.

In the preferred embodiment, Steps (i) and (ii) above are accomplished as follows. In summary,
 1. Choose a value of H (number of working nodes 17) and P (the overlap parameter) for the RBFN 11.
 2. Train the network using S-fold cross validation (defined later).
 3. Repeat steps 1 and 2 with different k-means clusterings.
 4. Determine the average cross validation error for the network structure.
 5. Repeat steps 1-4 with different values of H or P. Search for a minimum of the average error. Select the optimal structure as the one with the minimum average cross validation error. $E_{ik}$ are made available from this step.
 6. Train multiple networks with the optimal structure using the entire training set. Choose the one with the minimum training error.

In more detailed terms, in addition to determining the values of the network 11 parameters, the appropriate network structure must be determined. This means choosing the optimal number H of working nodes 17 (RBFN units) and the optimal value of the overlap parameter P for the nearest neighbor heuristic. This is accomplished in the preferred embodiment by Steps 1-5 above.

Specifically initial values for H and P of RBFN 11 are chosen (Step 1). RBFN 11 is then trained using the commonly known S-fold cross validation procedure (Step 2). The generalized S-fold cross validation procedure (SFCV), which is based on statistical resampling theory, makes maximum use of the available data while still giving an unbiased error estimate. For this method, the training data are randomly partitioned into S equally-sized subsets. Typically S ranges from 10 to K, where K is the total number of training examples. When $S=K$, this procedure becomes the "leave-one-out" procedure. Preferably $S=K$ for $K<100$ and $S=10$ for $K \geq 100$. For an RBFN 11 having a given H (number of working nodes 17), i.e., a given network structure, S different networks are trained using all of the data except one of the S subsets. Following training, the error is determined for each example in the subset that was held out. Thus, each example is used to train all the networks except one, and each example has an error associated with it based on the network that did not use that example for training. If $S \geq 10$ then each of the S networks will have seen at least 90% of the training data and therefore should perform similarly to a network of the same structure trained on all of the training data. The mean square error over all the training examples is an unbiased estimate of the application error for this network structure.

In practice, the k-means clustering algorithm of the Moody and Darken training (discussed above) can exhibit local optima so that different clusterings are possible and can be found by using different initial conditions for the clustering algorithm. As such, the foregoing procedure is repeated with different values of H and P for different k-means clusterings (Step 3). Preferably the entire S-fold procedure is repeated several times for each network structure and the average of the unbiased error estimates is obtained (Step 4). If S is large though, the foregoing is usually not necessary because the cross validation procedure trains S different networks with different clusterings to produce a single estimate of the error.

Steps 1-4 are repeated with different values of H or P, in search of a minimum of the average of the cross validation error. The values of H and P which produce the minimum average of the cross validation error are the optimal H and P (Step 5). The resulting network structure is the underlying network 11a of FIG. 2. For purposes of illustration and not limitation, the resulting underlying network 11a is shown with H=2, i.e., two working nodes 17a, 17b.

Because of the variability in clustering, several networks 11a are trained, and the network with the lowest training error is chosen (Step 6) for use in the present invention network 41. There is no danger of overfitting at this stage because the structure for the underlying network 11a was selected based on the cross validation procedure.

The completion of Steps 1-6 of the preferred embodiment completes the first half of the above summarized general four step method for providing the network of the present invention. To continue, the parameters $n_h$, $V_h$, $\rho_h$ (or $\omega_h$), $S_{hi}^2$, and $CL_{hi}$ or $CL'_{hi}$) discussed later, for the chosen underlying network 11a are determined from the training using all the available data (Step iii).

With respect to Step iv, as discussed earlier, determining the reliability of any neural network output has two parts. First, one must determine whether or not the network is extrapolating. If so, then the network output is unreliable because the network has not learned what output is associated with the given input. If the network is not extrapolating, then one needs to estimate the accuracy of the model fit, which is preferably given as a confidence interval on each network output. The implementation of each of these measures is presented in detail below.

The goal of the extrapolation measure is to determine if there is enough training data in the vicinity of the test point to reliably make a prediction. The approach taken here is to estimate the density of training data in the vicinity of the test point and to express the extrapolation decision as a continuous measure. The preferred embodiment employs two extrapolation measures, Max-Act the maximum activation of the RBFN units (working nodes 17) and $\rho(x)$ the local probability density of training data.

Max-Act has a simple conceptual basis and is defined $$\text{Max-Act} = \max[a_h(x)], \ 1 \leq h \leq H \quad (3)$$

Since each RBFN unit 17 is "centered" on a subset of the training data by the k-means clustering algorithm, as the test point x moves away from the training data, the value of the maximum activation will decrease. A small value for the maximum RBFN unit 17 activation, such as less than 0.5, indicates extrapolation. Unlike the convex hull analysis, this measure is valid even when the data distribution is non-convex.

While this is the most obvious definition for an extrapolation measure, Max-Act only indicates the existence of training data in the vicinity of the test point, but does not indicate the amount or density of training data in the region. Since it does not reflect data sparsity, Max-Act is not an ideal measure of the sufficiency of the training data. A more satisfactory measure is the local probability density of training data $\rho(x)$.

In the preferred embodiment, the underlying RBFN 11a is first trained for functional approximation or pattern classification, and the local data density estimate $\rho_h$ (for a unit/working node 17) is developed with the resulting fixed unit centers $x_h$ and widths $\sigma_h$. An estimate of the local density for a point contained in more than one unit (working node 17) is obtained by averaging the density estimates associated with all working nodes 17 containing the point and by generalizing to include the case of a test point falling outside all working nodes 17 by defining $V_0$ to be the complement of the space covered by the nodes 17. The activation function for $V_0$ is $a_0(x) = 1 - \max(a_h)$, that is, $a_0 = b$ if and only if the activation of all working nodes 17 is zero. With this definition, an estimate of the local density is:

$$\rho(x) = \frac{\sum_{h=0}^{H} a_h(x)\rho_h}{\sum_{h=0}^{H} a_h(x)} = \frac{\sum_{h=1}^{H} a_h(x)\rho_h}{\sum_{h=1}^{H} a_h(x) + 1 - \max(a_h)} \quad (4)$$

With $a_h$ acting as a continuous variable, Eq. (4) becomes a weighted average of unit densities, instead of a simple average, the weights being the activations caused at each working node 17 by the test point. If the test point is close to a node center $x_h$, its activation $a_h$ will be high and the corresponding working node density $\omega_h$ will appear with a weight approaching one. On the other hand, if a test point is far away from a working node center $x_h$, its activation $a_h$ and hence its weighted contribution will be small. If the test point is far from all working nodes 17, then the complimentary activation function $a_0(x)$ will approach unity, while the Equation 4 numerator simultaneously approaches zero, and the resulting density $\rho(x)$ will approach zero. Thus all working nodes 17, as well as the complementary space $V_o$, simultaneousiy enter into the weighted average data density when $a_h$ is a continuous quantity.

Within each working node 17, the mean probability density is defined as $$\rho_h = (n_h/K)/V_h$$

where working node volume $V_h$ is the integral of the activation function over the input space, such that $$V_h = (\pi^{\frac{1}{2}}\sigma_h)^N;$$

K is the total number of training points; and $n_h$ is the number of points assigned to working node h. In the preferred embodiment, the activation function is defined such that working node volume $V_h$ is the integral of a spherically semetric distribution. Other embodiments may define the activation function such that working node volume $V_h$ is the integral of an ellipsoidal distribution or other geometrical, N-dimensional distribution function.

In determining $n_h$, only the proximity of $x_k$ to $x_h$ is considered, and each point is allowed to contribute to each working node 17 independently. To determine the degree of inclusion of a point in a RBFN unit (working node) 17, the activation $a_h$ at a unit h (working node 17) caused by a training point ($x_k$) is taken to be the membership function of the point in that node. Thus points far away from a working node are counted less than those close by, but all points contribute to some extent to all working nodes, and only a point coincident with a working node center is counted in full. Accordingly, the effective number ($n_h$) of training points associated with working node h is given by the sum of the activations of node h over the training points:

$$n_h = \sum_{k=1}^{K} a_h(x_k) \quad (5)$$

where $a_h(x_k)$ is the activation of working node h given training input $E_k$. It is noted that the sum of $n_h$ over all the working nodes does not necessarily equal K, the total number of training examples.

Note that when the activation $a_h$ of a working node 17 for a given training point is regarded as the membership function of that point in the node, then $a_0 = 1 - \max(a_h)$ can be interpreted as the membership function for the space outside the working nodes 17. Thus the intuitive extrapolation measure Max-Act can be interpreted as the membership function in the space covered by working nodes (RBFN units) 17. The contour Max-Act=0.5 represents equal membership in the spaces inside and outside the space covered by RBFN units 17.

Referring back to FIG. 2 the data density index $\rho$ is implemented in the preferred embodiment of the present invention network 41 by adding several auxiliary nodes (included in output node assembly 45) to the underlying RBFN 11a. In particular, a first summation node 47 connected with unit weights to working nodes 17a, 17b calculates the denominator of Eq. (4), and another summation node 49 connected to working nodes 17a, 17b with weights $\rho_h$ calculates the numerator.

Alternatively the weights $\omega_h = \rho_h/\rho_{max}$ rather than $\rho_h$ itself are used, where $\rho_{max}$ is a constant representing the maximum value of $\rho$ over all input space. Using $\omega_h$ has the effect of normalizing the estimated density between 0 and 1, which is easier to interpret than the absolute density, which depends strongly on the dimension of the input space. The scaling factor $\rho_{max}$ is found approximately by limited search. The value of the unscaled density function $\rho$ is calculated at the center of each working node 17 and at the point on the line between every two working node centers where activation of the two working nodes is equal. The maximum $\rho$ is likely to occur only at or near these locations. The forementioned point between any two centers is an approximation to the point of maximum overlap of the activation functions and the centers represent local peaks of activation. The maximum value of the sum of activations is guaranteed to occur at one of these points. This method is not guaranteed to find the true maximum for the numerator of $\rho$, but experience has shown that the maximum value found in this search is quite close to the actual maximum value, so that this results in a reasonable scaling factor.

In addition to summation nodes 47 and 49 in FIG. 2, a "maximum" node 43 is connected to the working nodes 17a, 17b with connections 51 having unit weights. And finally a ratio node 53 outputs $\rho(x)$. The ratio node 53 receives as input (i) the results of summing node 49, and (ii) the results of intermediate summing node 55. The intermediate summing node 55 combines the results of first summing node 47 and bias node 19 of the underlying RBFN 11a, and offsets the combination by the results of MAX node 43. This is accomplished by respective connections of positive unity (+1) weight connecting first summing node 47 and bias node 19 to intermediate summing node 55, and a negative connection (−1 weight) connecting MAX node 43 to intermediate summing node 55.

Having provided an extrapolation measure by auxiliary nodes 43, 47, 49, 53 and 55 above, Applicants provide a measure of accuracy of fit (the second portion in determining reliability of a neural network) as follows. In the preferred embodiment the accuracy of the fit for a given output in the region of the test point is based on an analogy to the confidence limits placed on a random variable. A local confidence interval is developed for each RBFN unit (working node) 17 and then the confidence limits for the network 41 prediction (output) at a given test point are formed by taking a weighted average of the confidence limits over all contributing units 17.

Assuming momentarily that training points can be associated unambiguously with units (working nodes) 17, the local estimate for the variance of the network residual in output i within the domain of unit h (working node 17) is:

$$s_{hi}^2 = \left[ \sum_{j=1}^{n_h} E_{ij}^2 \right] / (n_h - 1) \tag{6}$$

where the summation is taken over the $n_h$ points inside the working node. $E_{ij}$ is the cross validation error on output i for training example j for the architecture of the working network, stored during the cross-validation procedure. To generalize Eq. (6) to Gaussian radial basis function units (working nodes 17), $a_h(x_k)$ is used to represent the membership of training point $x_k$ in unit/node h. Each training point is allowed to contribute to the error estimate in proportion to its membership in the unit/node, as in Eq. (4). The resulting local variance of the network residuals for output i at working node h is:

$$s_{hi}^2 = \left[ \sum_{k=1}^{K} a_h(x_k) \cdot E_{ik}^2 \right] / (n_h - 1) \tag{7}$$

where $n_h$ is now defined as in Eq. (5). The 95% confidence limit for the expected value of the residual associated with output i for working node h is given by:

$$CL_{hi} = t_{95} \cdot s_{hi} \cdot n_h^{-0.5} \tag{8}$$

where $t_{95}$ is the critical value of Student's t statistic for 95% confidence with $n_h - 1$ degrees of freedom. Because the effective number of data points in a radial unit (working node 17) $n_h$ is a continuous-valued function, the value of $t_{95}$ is calculated from a continuous polynomial fit of $t_{95}$ versus $1/(n_h - 1)$. $t_{95}$ may alternatively be calculated from a tabularized, splined or similar fit. Finally, the confidence limit for a test point is an average of the RBFN unit (working node 17) confidence limits, weighted by the contribution of each unit/working node to the output for the current input:

$$CL_i(x) = \left[ \sum_{h=1}^{H} a_h(x) \cdot CL_{hi} \right] / \left[ \sum_{h=1}^{H} a_h(x) \right] \tag{9}$$

where $CL_i(x)$ is the confidence limit for the output i at test point x. For test points far from any working node center, all of the activations will be low. By dividing by the sum of the activations the value of $CL_i(x)$ asymptotically approaches the value of $CL_{hi}$ for the unit/working node 17 that is "nearest" to the test point, where "nearest" is in terms of the distance scaled by each of the units' respective widths, $\sigma_h$.

$CL_i(x)$ is implemented in the preferred embodiment by taking the ratio of the output value of two summation nodes 47 and 57 as shown in FIG. 2. The connections between working nodes 17a, 17b and summation node 57 have weights $CL_{hi}$ so that the summation node 57 calculates the numerator of Eq. (9). The summation node 47 is common to all $CL_i(x)$ and represents the denominator in Eq. (9). This is the same node 47 used in the extrapolation measure. $CL_i(x)$ is then calculated by taking the ratio of the values output by these two nodes 47, 57. Specifically, ratio node 59 receives on input the results of summing nodes 47 and 57, and in response, calculates the ratio of the received values to provide $CL_i(x)$ as its (node 59) output.

The foregoing assumes the residuals of the network 41 are independent, normally distributed with a mean of zero and a constant variance over the neighborhood defined by each RBFN unit (working node) 17 but varying from unit to unit. For the residuals to be normally distributed independent random variables, all of the systematic variation of the dependent variable has to be accounted for by the neural network 41. This implies that the network form matches exactly the form of the true function being estimated. Because the true functional form is unknown and the neural network model is empirical, the assumption of normally distributed errors may not be completely accurate. Nonetheless, the foregoing still provides an indication of the relative accuracy of the network 41 predictions for the cases Applicants have investigated.

Instead of asking for a local confidence limit of the expected value of the model (network) prediction, one could pose the question of the limits of the dispersion of the individuals, i.e. the range of possible values for a single sample, rather than the dispersion of the mean. This can be estimated in much the same way as the confidence limit of the expected value of the model prediction. To do this, the variance of the residuals is calculated as in Eq. (7). Assuming the individuals are normally distributed, confidence limits on the individuals can be set based on the standard normal distribution. However, the true mean or variance of the residuals are not known but only a finite sample to estimate them exists. The mean may be non-zero because of mismatch between the empirical and true models. To account for this uncertainty in the distribution of the errors, the variance of the mean and the individuals are pooled. In deriving $CL_{hi}$ Applicants assumed the variance of the mean was equal to $s^2_{hi}/n_h$, therefore the sum of the variances is $(1+1/n_h)$ $s^2_{hi}$ and the confidence limit ($CL'_{hi}$) for individual values of output i for unit h is given by:

$$CL'_{hi} = t_{95} * s_{hi} * (1+1/n_h)^{0.5} \quad (10)$$

where all the terms are defined as in Eq. (7). The confidence limit of individuals for network prediction i is analogous to Eq. (8) except that $CL'_{hi}$ is substituted for $CL_{hi}$. In the following examples $CL'_{hi}$ is shown as a band around the model (network) predictions.

EXAMPLES

The following examples are intended to illustrate, not limit, key features of the present invention neural network 41. For each example, a computer system embodying a neural network 41 of the present invention is employed and is generally as shown at 110 in FIG. 3. The computer system includes a host processor 130 in which the operations of a neural network 41 are executed. Briefly, an input source such as on-line data from a workstation terminal, stored data from memory, and the like provides input to the computer system 110 at 170. The input is preprocessed by I/O processing 190 which queues and/or formats the input data as needed. The preprocessed input data is then transmitted to host processor 130 which processes the data through neural network 41. In particular, neural network 41 maps the input data to an output pattern and generates indications of reliability (i.e., MAX-Act, $\rho$, $CL_h$) of that output pattern for the given input data. Neural network 41 provides the output for either memory storage 210 or display through an I/O device, e.g., a workstation display monitor, a printer, and the like. In the latter case the output data is formatted through I/O processing 230 and transmitted accordingly for display at a monitor or printing at a printer and the like.

Example I

The first example is a simple one-dimensional problem in which the shapes of the functional estimation and the reliability functions of the present invention network 41 are readily visualized.

The problem is to estimate a single input, single output function given by $$y(x) = 0.5 \sin(1.5\pi x + \pi/2) + 2.0 + \nu$$

where x is the independent variable, y is the dependent variable, and $\nu$ is Gaussian noise. To demonstrate how reliability of the estimation can vary locally, three cases were studied. For each case fifty training examples were used. The training set was produced by pulling samples on the interval $[-1,1]$ according to one of two probability density functions for x. The corresponding target outputs were produced using one of two distributions of $\nu$. In each case a series of networks (RBFN's) were trained with the number of working nodes ranging from 2 to 30 with the overlap parameter $P=2$. The results are reported for the optimal network (underlying RBFN) as selected by the SFCV procedure. In all cases the value of S used was 50.

Figure 4A:
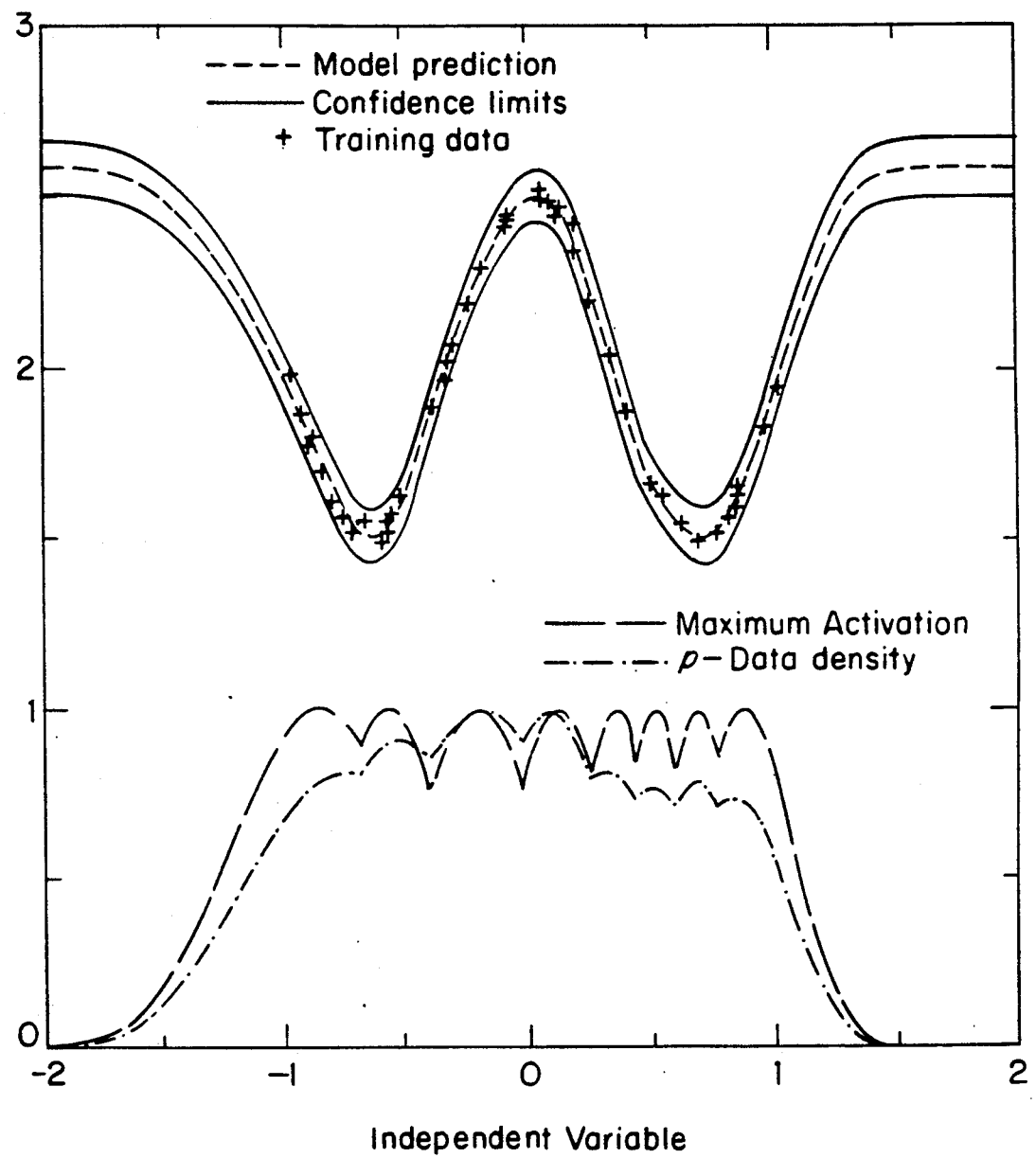
FIGS. 4a–4c are graphs of present invention network output estimating a one dimensional function.

In the first case, the x values were sampled from a uniform distribution on the interval $[-1,1]$ and $\nu$ had a standard deviation of 0.03. The optimal network structure contained 8 RBF units (working nodes) although networks with 7, 9, and 10 units performed almost as well. The network output fit (i.e., model prediction), the reliability measures, and training data are shown in FIG. 4a. The network output fit the subject function well. The confidence limits shown are for individual values of y so that 95% of all values should lie within the confidence band. Using a threshold value of 0.5 for the maximum activation measure indicates the network is extrapolating for $x < -1.27$ and $x > 1.09$. The minimum value of $\rho$ (scaled 0–1) at the original training points is 0.554. Using this as a threshold value, $\rho$ indicates extrapolation for $x < -1.1$ and $x > 0.99$. Both measures MAX-Act and $\rho$ give reasonable estimates of the original sample interval of $[-1,1]$, with $\rho$ being more precise.

Figure 4B:
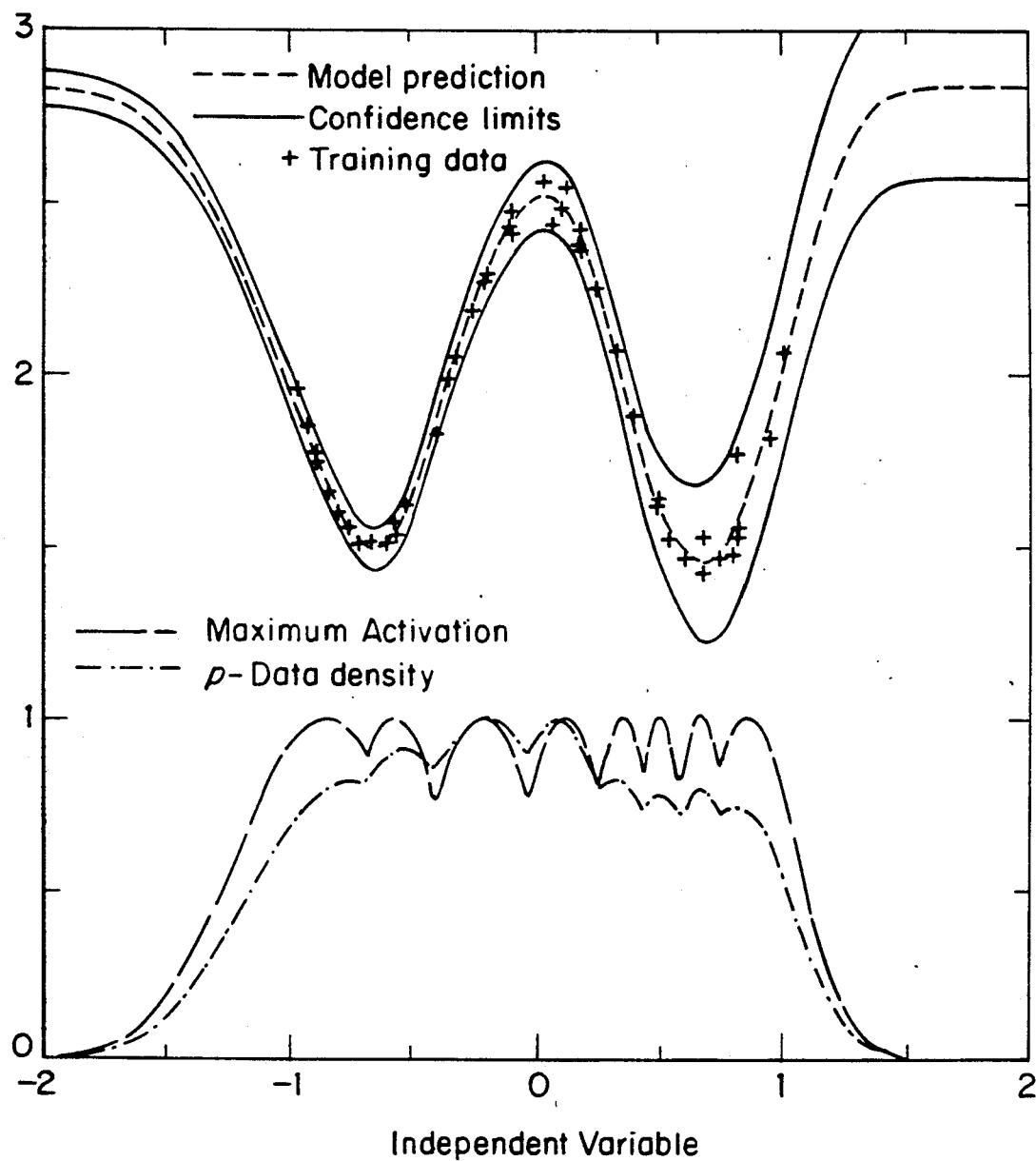

FIG. 4b shows the optimal network trained on the same x data as the previous case but where the standard deviation of $\nu$ was given by:

$$Stdv = 0.045 + 0.04x$$

The optimal number of RBF units (working nodes) was again 8. The confidence band in FIG. 4b shows the uncertainty in y increases as x increases reflecting the increasing noise in y. Because the extrapolation measures are a function of only the input variables and the same x values were used in both cases, MAX-Act and $\rho$ look similar in both cases.

Figure 4C:
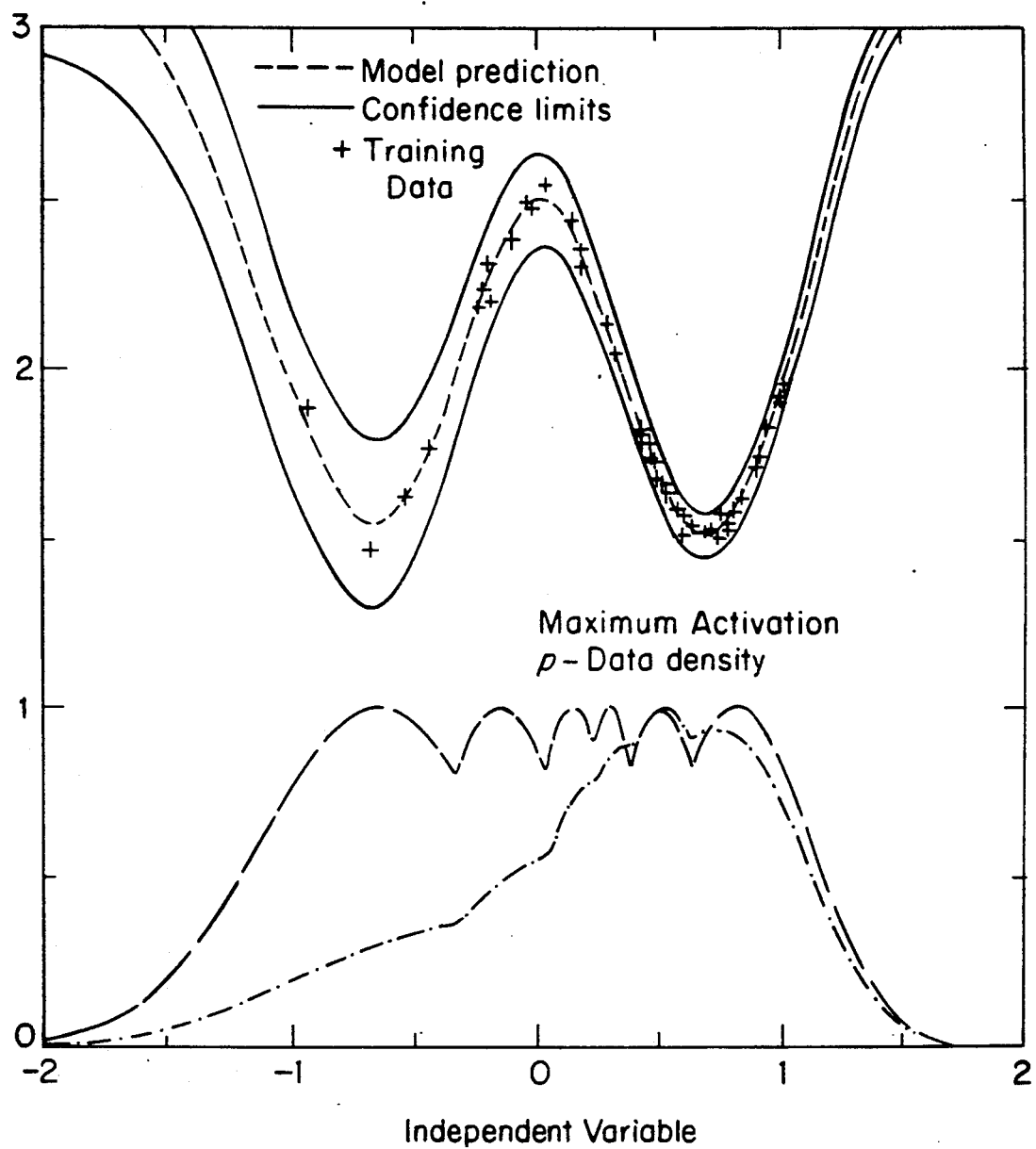

In the third case, the noise in y was constant as in the first case, but now the x data are sampled from a nonuniform distribution with the probability density function $f(x)=0.5+0.45x$ for $-1.0 \leq x \leq 1.0$ and zero otherwise. This results in having few training data near $x=-1$ and more near $x=1$. The optimal number of hidden units for this case was six. The results are shown in FIG. 4c. Even though the noise in y is constant, the confidence band is wider near $x=-1$ than near $x=1$, reflecting the increase in uncertainty in the estimation of y due to less training data. Notice that the skewness of the distribution of x values is captured by $\rho$, but not by MAX-Act.

Example II

The second example is intended to demonstrate network performance on a more practical example, a model-based control problem.

This problem, presented by Economou et al. "International Model Control 5. Extension to Nonlinear Systems," *Ind. Eng. Chem. Proc. Des. Dev.*, vol. 25, page 403–411 (1986), is a multi-input, multi-output problem representing an ideal, adiabatic, continuous stirred tank reactor (CSTR) with a reversible, first order exothermic reaction. The forward reaction, A→R, is first order in A with rate constant $k_1$. The reverse reaction is first order in R with rate constant $k_{-1}$. The feed is pure A and the desired product is R. The system is simulated by a set of coupled ordinary differential equations determining the reactant mass balance, the product mass balance, and the energy balance:

$$dA_{out}/d\tau = 1/t(A_{in}-A_{out})-k_1 A_{out}+k_{-1}R_{out}$$

$$dR_{out}/d\tau = 1/t(R_{in}-R_{out})+k_1 A_{out}-k_{-1}R_{out}$$

$$dT_{out}/d\tau = 1/t(T_{in}-T_{out})+(-\Delta H_R/\rho C_p)/(-k_1 A_{out}-k_{-1}R_{out})$$

The reaction is normally run around 400K.

The goal is to develop a model (neural network) for use in an internal model controller. What must be learned is the open loop relationship between the controlled variable, which is the concentration of R, and the manipulated variable, which is the temperature of the feed stream, $T_{in}$. Also the network predicts the actual reactor temperature $T_{out}$, which is used as a check on the temperature measurement. Because of the dynamics of the problem, the network must capture the state information about the reaction. This is done by giving the network a short history of the process as input, specifically, the past six measurements of $T_{in}$ and R and the present value of $T_{in}$. The space-time of the reactor is one minute and the data is sampled every thirty seconds so that the history input to the network is three times the characteristic time of the process which adequately captures the state of the process. The training data were generated by simulating a process run of 60 minutes producing 114 training examples. In order to adequately cover the normal operating domain, $T_{in}$ was randomly varied over the range (370K, 430K). $T_{in}$ was changed and new values of [R] and $T_{out}$ were recorded every 30 seconds. The output targets for the network were scaled so that the model would not be overly biased toward fitting one output at the expense of the other.

Figure 5A:
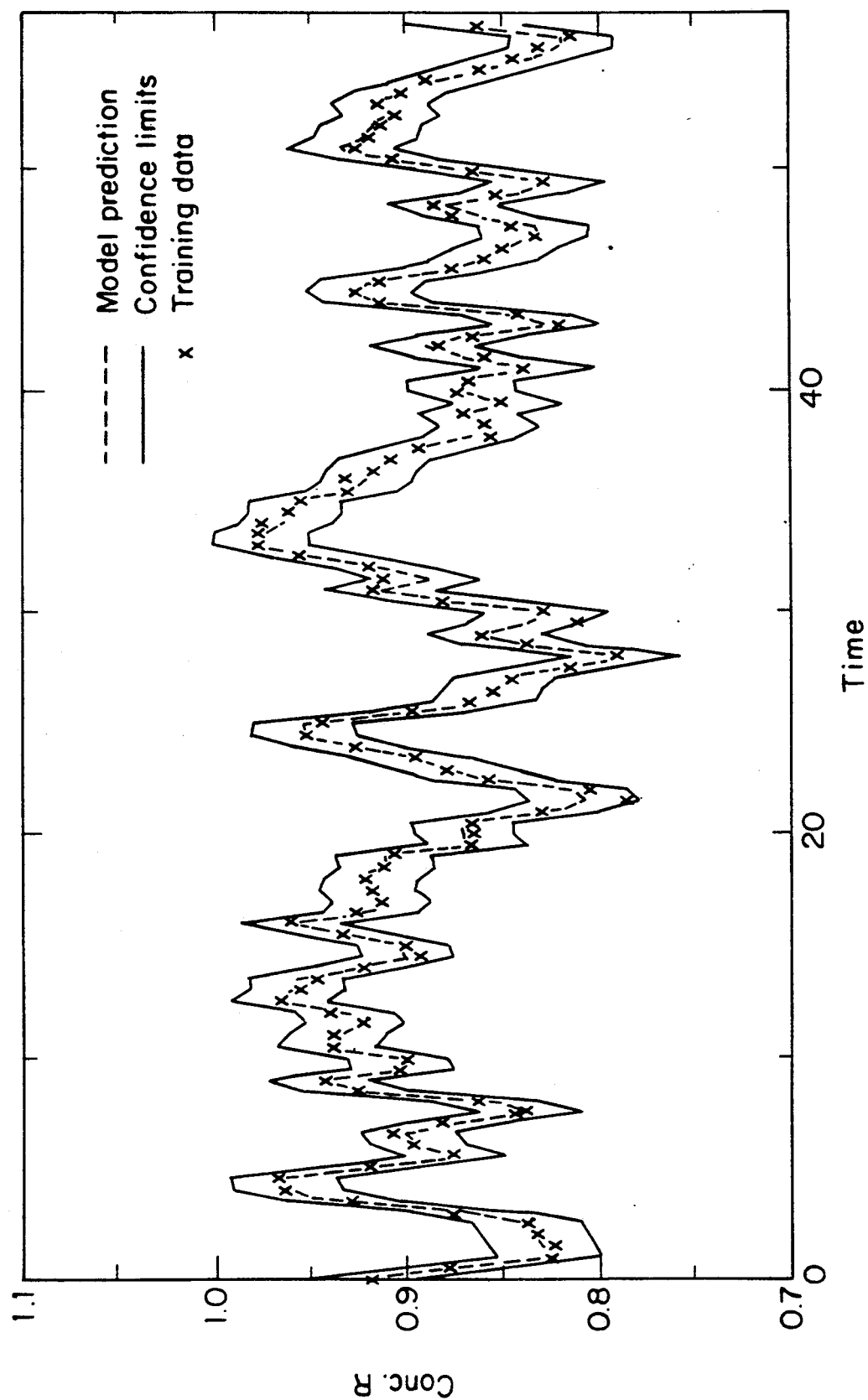
FIGS. 5a–5c and 6a–6c are graphs of present invention network output for modeling a chemical reactor process.
Figure 5B:
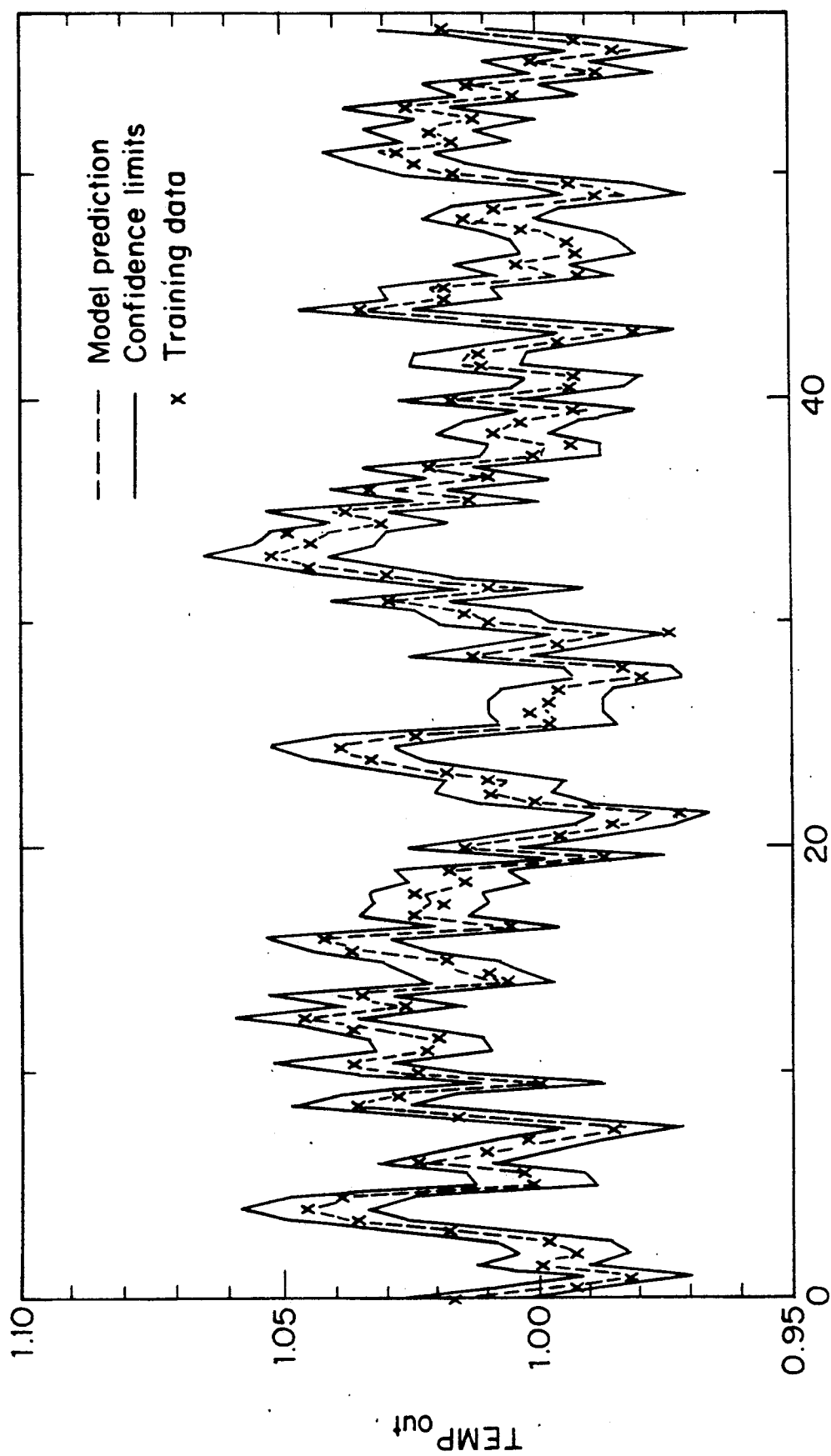
Figure 5C:
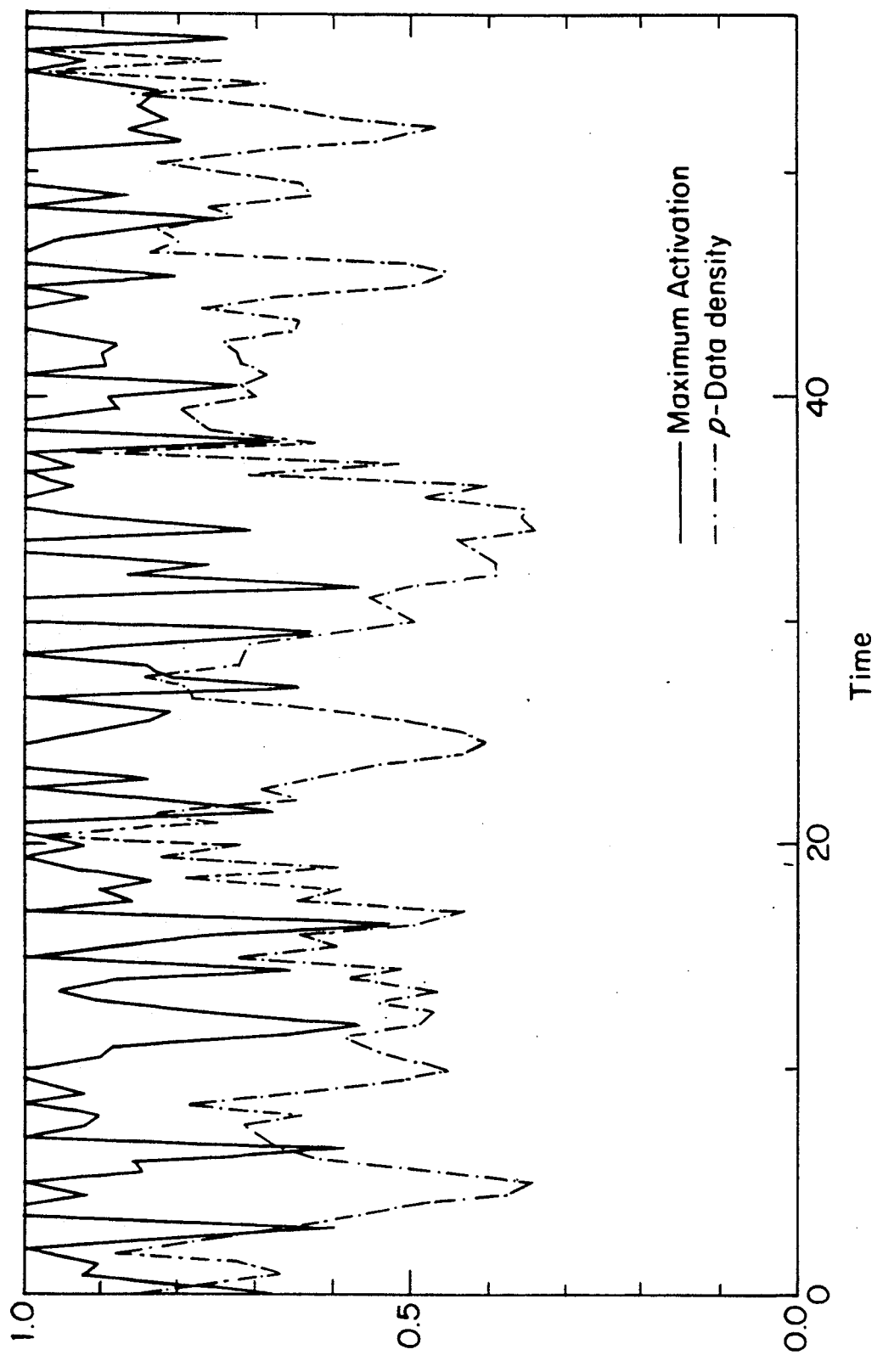

About 25 RBFN architectures were trained using the procedure described previously using $S=K=114$ (leave-one-out cross validation), so that 115 RBFNs were trained for each architecture. In these runs, the number of RBF units ranged from 2 to 90 and the overlap parameter P varying from 2 to 10. The optimal network structure for this problem indicated by cross validation was $H=75$ working nodes and $P=10$. Individual nets took about 10s to train, and the total computational time for these runs was approximately 8 hrs on a VAXstation 3100 workstation. As in the previous example, the network performance was not overly sensitive to the number of hidden nodes. FIG. 5a shows the model predictions, the confidence bands, and the training data for [R]. The model fits the training data well and the confidence interval encompasses all of the training data. FIG. 5b shows the model predictions, the confidence bands, and the training data for $T_{out}$. Again the model fits the training data well and the confidence interval encompasses all of the training data. FIG. 5c shows the extrapolation measures versus time on the training data. The consistently high values of the maximum activation ($>0.5$) indicates that all the training data are within the domain of the RBF units as expected. The average value of $\rho$ (scaled 0–1) is approximately 0.6 with a maximum value of 0.99 and a minimum value of 0.33.

The key feature of this problem is that the relationship between $T_{in}$ and [R] changes dramatically depending on the state of the process. In fact, when the reactor temperature is above 434K, the steady state gain between $T_{in}$ and [R] changes sign because the reverse reaction is favored at higher temperatures. This change in the sign of the gain of the transfer function would cause a controller based on the empirical model to make corrections in the wrong direction. Thus using the neural network model outside the range of the original training data would be quite detrimental.

Figure 6A:
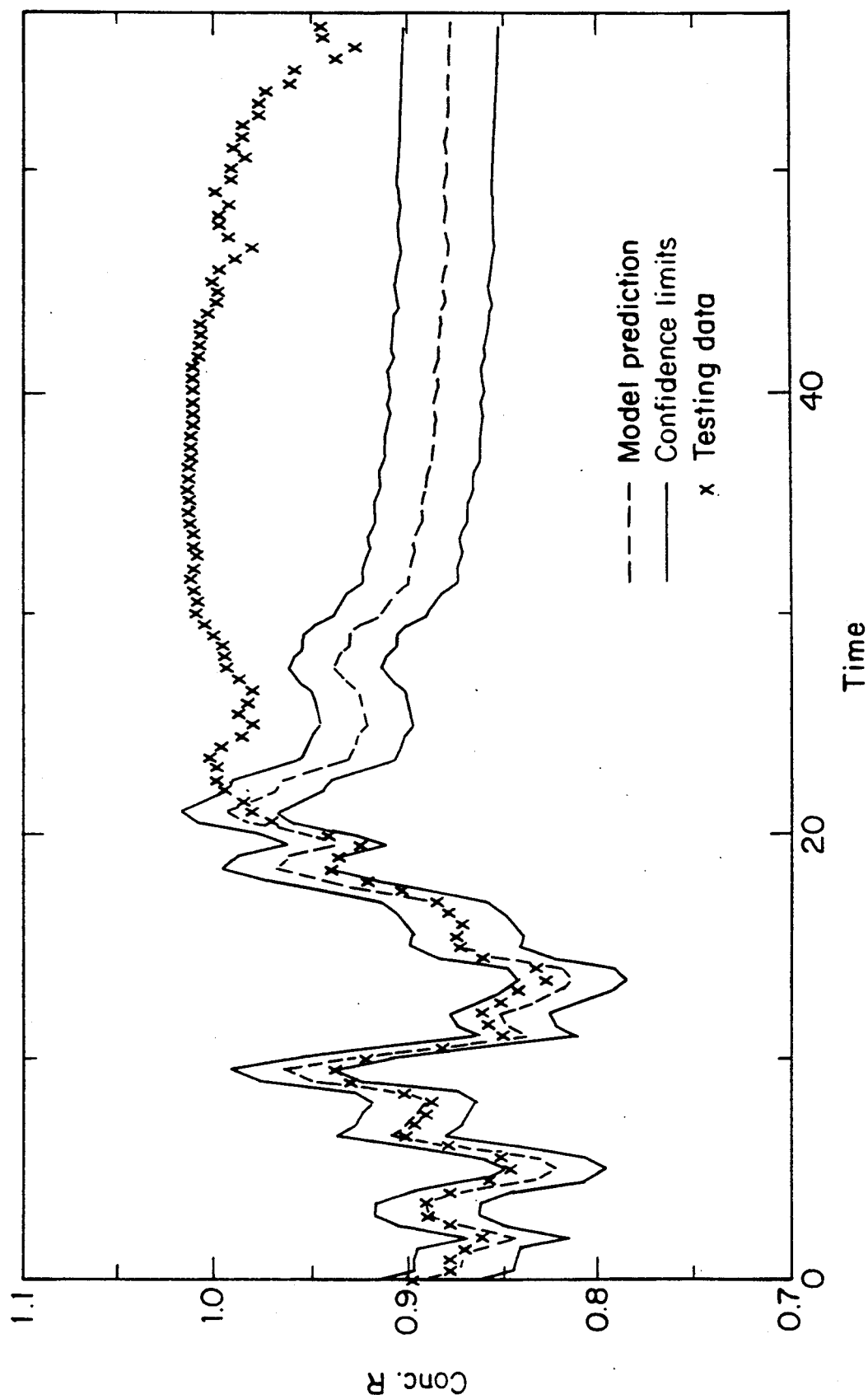
Figure 6B:
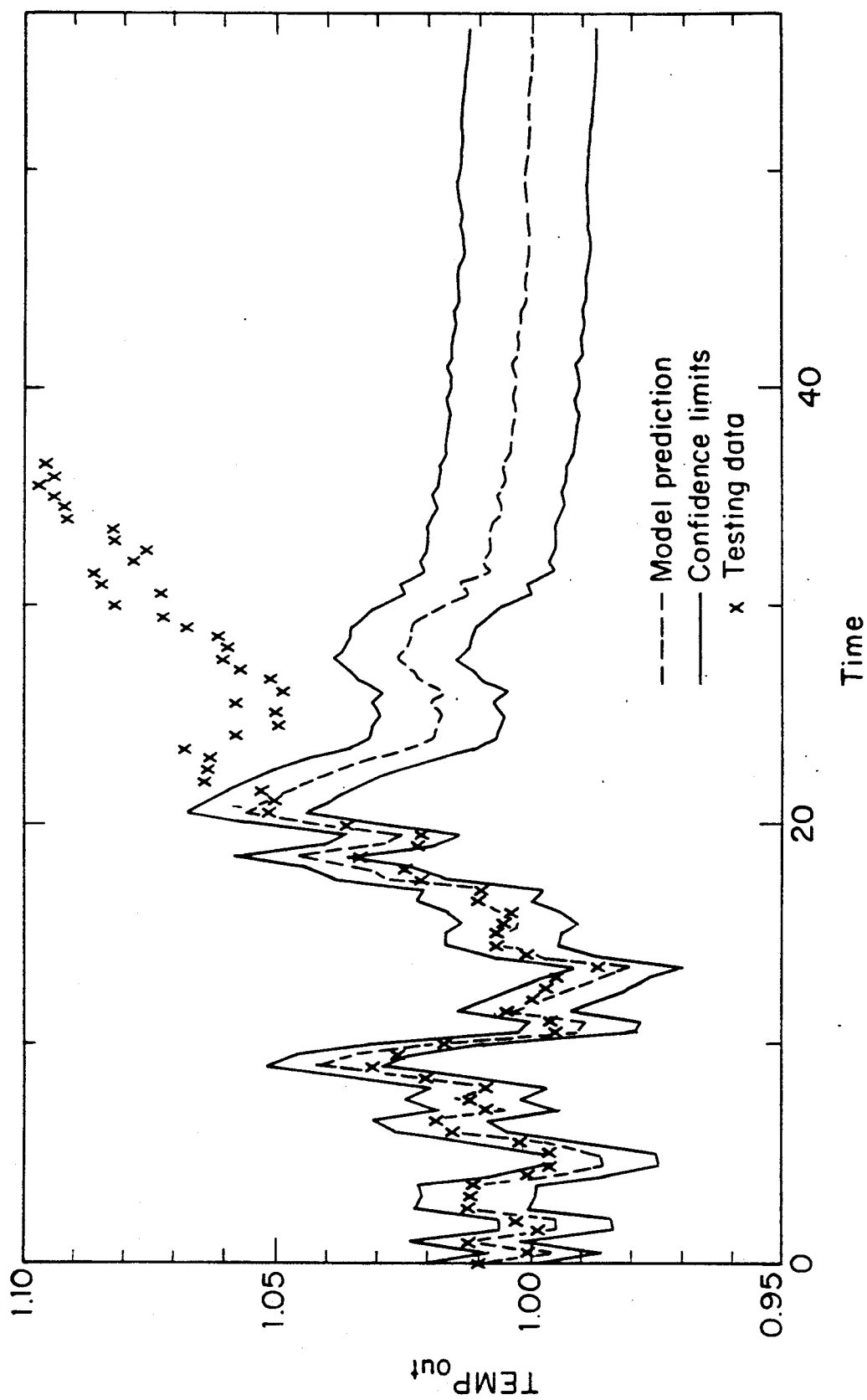
Figure 6C:
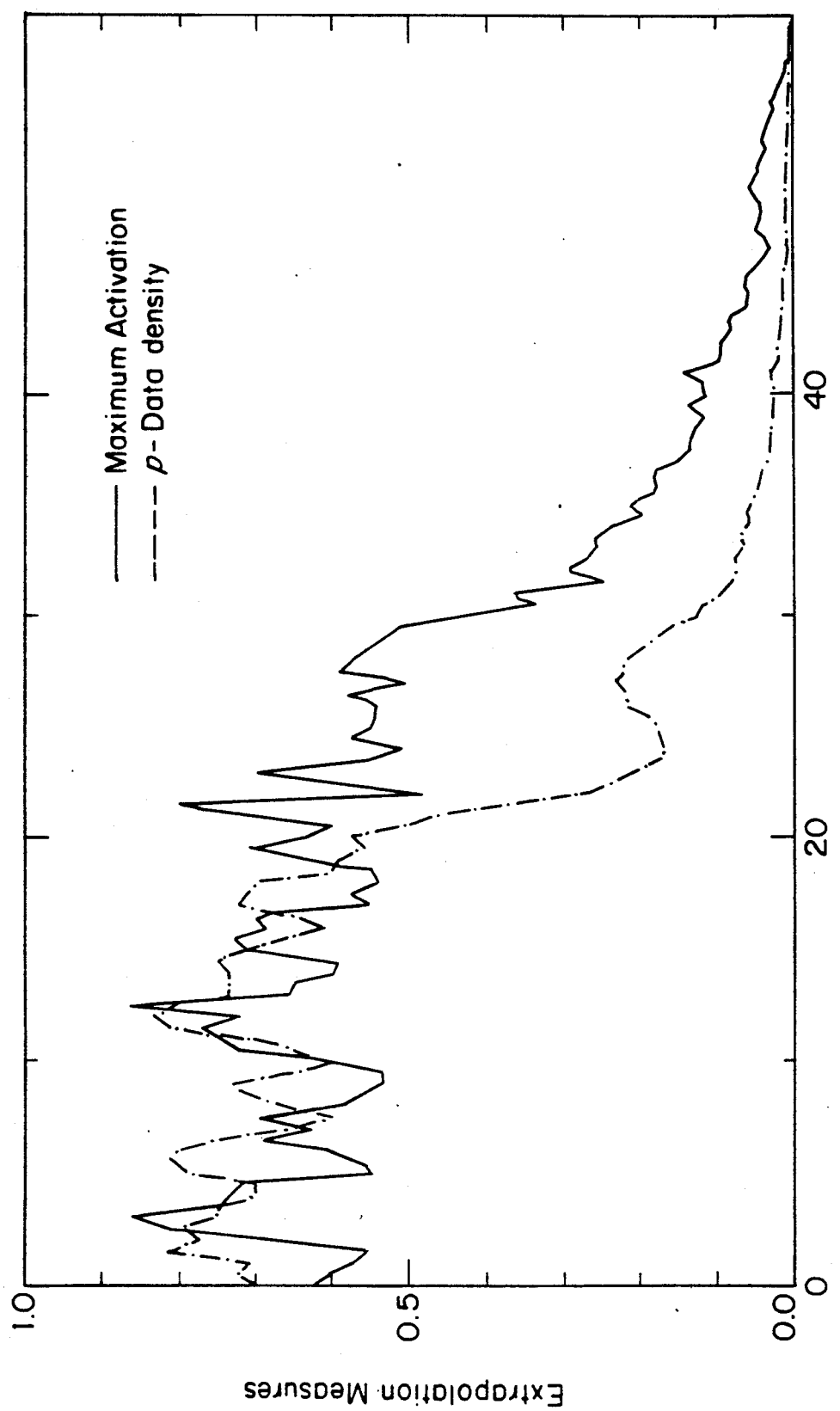

To demonstrate the network performance when extrapolating, a testing data set was generated where the nominal target value of $T_{in}$ was not constant but increasing by 1.5K per minute after 15 minutes of normal operation. Beyond 22 minutes the model no longer accurately predicts [R] or $T_{out}$ (FIGS. 6a and 6b). This is because the process is moving into a region for which the model was not adequately trained. This is indicated by $\rho$ dropping to a value less than 0.33 (FIG. 6c). The maximum activation is approximately 0.5 from 22 to 30 minutes while $\rho<0.33$ indicates the network is being used for extrapolation or in a region with too little training data (FIG. 6c). After 30 minutes the maximum activation drops below 0.5 indicating extrapolation. While both $\rho$ and MAX-Act indicate extrapolation, $\rho$ is the more sensitive indicator since it reflects movement into a region of sparse data which occurs before the process leaves the region covered by radial units (working nodes).

Example III

The third example problem is a classification problem. In addition to their use as nonlinear functional approximaters, neural networks are also used as trainable pattern classifiers. The primary goal is to assign a "pattern" to one or more of a finite set of prespecified classes. The pattern is a vector of features containing information useful in identifying the correct class(es) of a case. The network is trained such that the feature vector is the network input and one output node corresponds to the class of the example pattern, there being a different output node for each possible class. During subsequent operation of the network, the network classification is taken as the class represented by the output node with the highest value. Using this formulation, if the network has enough representational capacity and the data are adequately dense, the network output represents the local relative probability densities of the classes. However, the criterion for predicting performance and selecting the optimal structure is not the difference between the target output and the actual output as before, but the fraction of cases the network misclassifies.

Because the accuracy of the network outputs in any given region depend heavily on the number of training examples available, a test of the local amount of training data in the vicinity of the test case is needed to verify that the classification is reliable. The extrapolation measures discussed above, namely $\rho(x)$ and the maximum activation (MAX-Act) of the working nodes, can indicate when the neural classifier output is unreliable.

While the extrapolation measures are useful, the corresponding measurements of the uncertainty of the outputs of the network are not. This is because in functional estimation problems the training targets represent the desired network outputs and the residual errors represent the lack of fit. In the classification problem the training targets do not represent the desired network outputs. The desired network outputs are the relative probabilities while the training targets are an encoding of a symbolic variable, the class label. By minimizing the residual error during training and selecting the network with the minimum predicted classification error, one produces a classifier which "learns" the relative probabilities. If one knew the correct relative probability of membership of each class for each training example, then the network could be trained as a functional approximation instead and the confidence limits would reflect the local variance of the probabilities of membership.

Thus, when the present invention network is used on classification problems the network does not include confidence limits on the outputs. Instead, the network has output nodes representing the M possible classes, MAX-Act and $\rho(x)$.

Referring now to the third example, this example is a simplified version of many static diagnosis problems. The measured states of the process are represented by x, a dimension two vector. The process has a nominal steady state at $x_0=(0, 0)$. Malfunctions are represented by one-at-a-time changes in a set of fault parameters p whose effect on the measurements x is linear:

$$x = x_0 + \underline{a}p + v$$

Each column of $\underline{a}$ represents the directional effect of one of the fault parameters on the measurement vector. The classes are defined as:

Normal $(C_0)$: $|p_1| < 0.05$, $|p_2| < 0.05$

Fault 1 $(C_1)$: $|p_1| < 0.05$, $\alpha_1 = [1,1]^T$

Fault 2 $(C_2)$: $|p_2| < 0.05$, $\alpha_2 = [1,-1]^T$ $Stdv_v = 0.015$

Training data were generated by sampling values of $p_i$ from a normal distribution with standard deviation 0.25. If $|p_i| < 0.05$, the example was considered to be in the normal class. Thirty examples of each class were produced. The optimal network structure was found to be 15 working nodes but the minimum of the SFCV curve was broad and flat with networks containing nine to thirty working nodes achieving approximately the same minimal error rate.

Figure 7A:
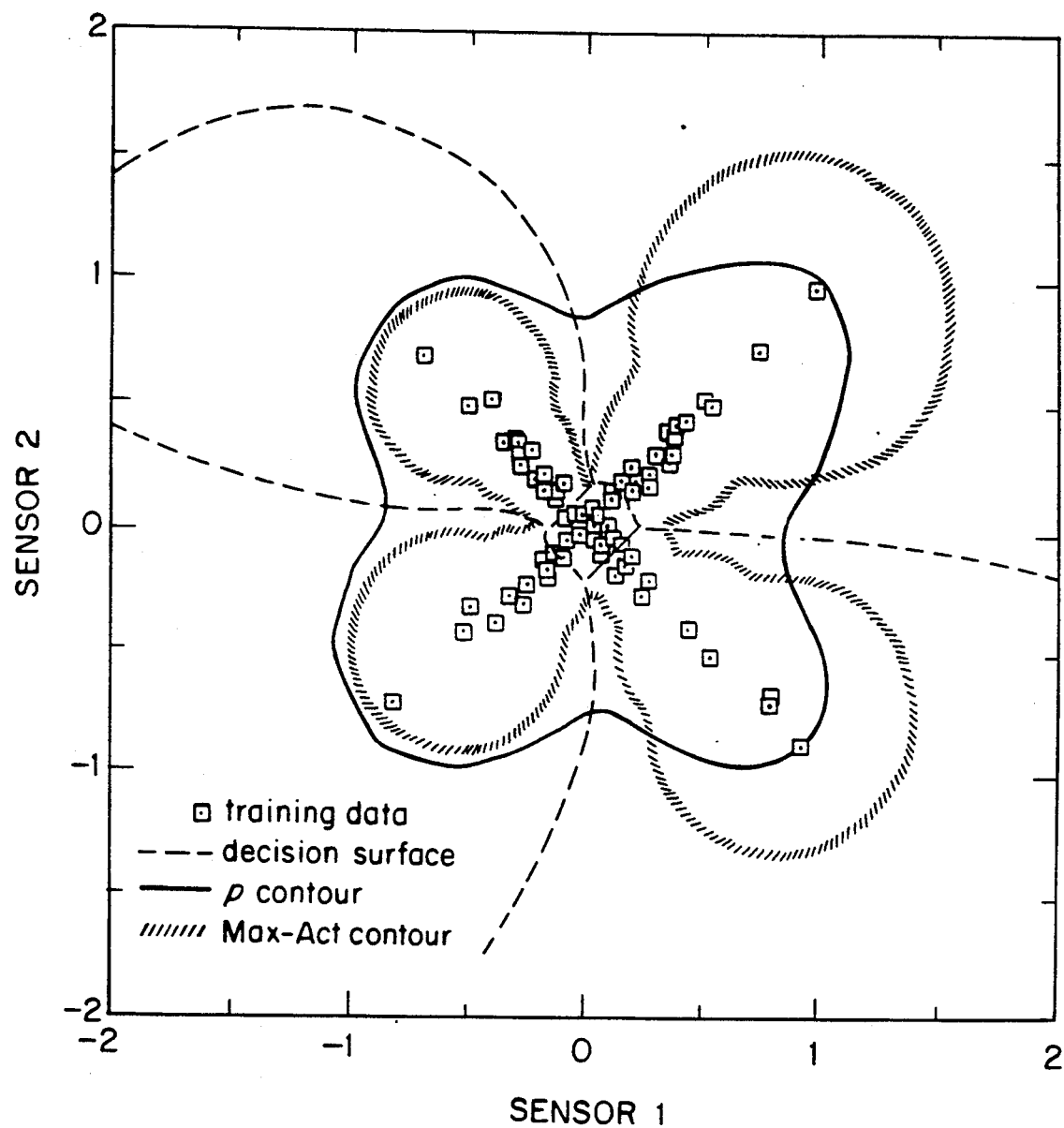
FIGS. 7a–7b are graphs of present invention network output as a pattern classification system.
Figure 7B:
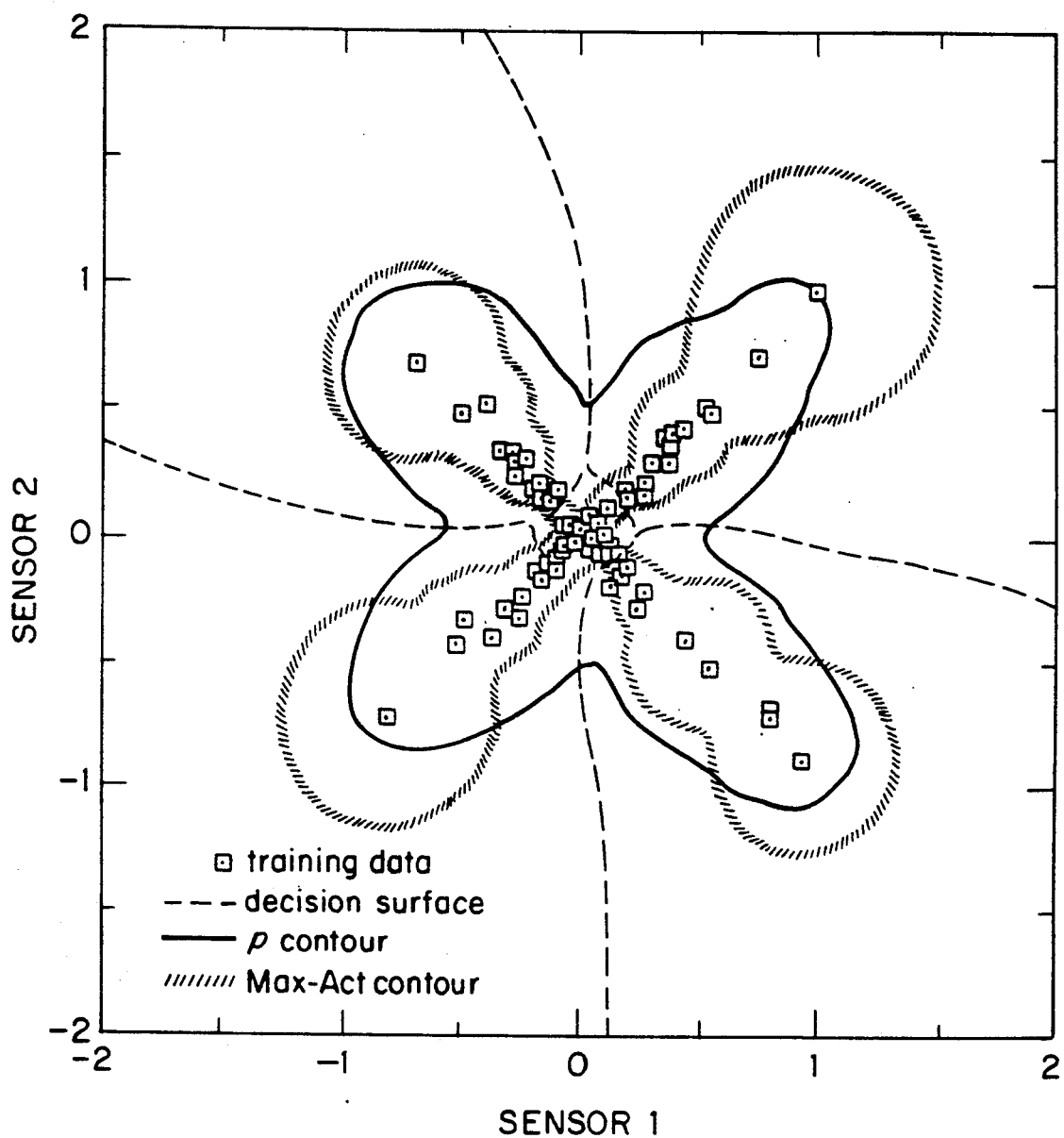

In general, Applicants have observed that the reliability measures tend to improve as the number of working nodes increases, in the range of near-optimal structures. FIG. 7a shows the decision surfaces and boundaries of the extrapolation measures defined by MAX-Act=0.5 and $\rho=0.036$ (the minimum over the training data) using 15 working nodes, while FIG. 7b shows the results using 30 working nodes (in this case the minimum training density contour $\rho=0.013$ is shown). For the network with 15 working nodes the extrapolation boundaries are a coarse estimate of the underlying distribution of the training points. The extrapolation boundaries for the network with 30 working nodes does a better job of capturing the shape of the parent distribution of training points. The sensitivity of the extrapolation boundaries to the number of working nodes is the same type of effect seen with varying window width in the Parzen windows approach to nonparametric 89 density estimation.

In sum, the state of the art has focused on using neural networks to form empirical models for engineering applications because of their powerful representational capacity and ability to handle multi-input, multi-output problems. However, conventional neural networks do not flag the user when they make predictions without adequate training data (i.e., outside the training data), and furthermore they do not provide error estimates on their predictions. The present invention network provides reliability measures in addition to network output (predictions), and in particular provides an indication of extrapolation and calculates confidence limits on its predictions (outputs). These reliability measures have been demonstrated on both functional estimation and classification problems. On several examples, the provided reliability measures successfully predict the quality of the network output fit within the range of adequate training data and diagnose when the network encounters novel inputs for which adequate training data was not available.

The preferred embodiment of the present invention network is implemented by adding connections and nodes to a RBFN that is trained in the manner described by Moody and Darken (1989) cited above. The additional weights of the invention network are based on statistics produced during the training and cross validation procedures of the underlying RBFN model. Thus, the invention network is produced with minimal extra work because no additional training is required, and all parameters in the underlying RBFN remain the same.

It is understood by those skilled in the art that other networks in addition to RBFN's may adopt or employ the self reliability check method and apparatus of the present invention.

EQUIVALENTS

While the invention has been particularly shown and described with reference to a preferred embodiment thereof, it will be understood by those skilled in the art that various changes in form and details may be made therein without departing from the spirit and scope of the invention as defined by the appended claims.

We claim:

1. A pattern mapping system comprising:
   an input layer for presenting an input pattern;
   a working layer of working nodes connected to the input layer for receiving the input pattern and generating activation signals in accordance with predefined training parameters, and (b) statistical signals associated with each activation signal;
   an output layer of output nodes coupled to the working layer for providing from the activation signals an output pattern indicative of the input pattern; and
   a node assembly coupled to the working layer for receiving the statistical signals and in response to the statistical signals providing an indication of reliability of the output pattern as a function of the predefined training parameters.

2. A system as claimed in claim 1 wherein the node assembly includes:
   at least a first node for providing an indication that the predefined training parameters are insufficient for the system to adequately respond to the input pattern; and
   at least a second node for providing a quantitative indication of error in the output pattern as a function of error in outputs of the working layer nodes established by the predefined training parameters.

3. A system as claimed in claim 2 wherein the second node provides a range of uncertainty of the output pattern as output from the output node.

4. A system as claimed in claim 2 wherein the node assembly further comprises plural summing nodes coupled between the working layer and the first and second nodes, one summing node being common to the first and second nodes.

5. A system as claimed in claim 1 wherein the output pattern identifies category of the input pattern such that the system is a pattern classification system.

6. A system as claimed in claim 1 wherein the output pattern is a functional mapping of the input pattern such that the system is a functional approximation system.

7. In a pattern mapping system, a method of identifying patterns comprising the steps of:
   presenting input signals in a presentation field, the input signals defining an input pattern;
   providing a plurality of working nodes, each for identifying patterns with respect to a plurality of predefined training parameters and generating at least one statistical signal relating the pattern identification with the predefined training parameters, the working nodes being coupled to the presentation field for receiving the input signals;
   providing a plurality of output nodes coupled to the pattern identifications from the working nodes such that the output nodes provide output patterns indicative of the input pattern; and
   providing an output indication of reliability of the output patterns provided by the output nodes, the output indication of reliability being based on the statistical signals of the working nodes.

8. A method as claimed in claim 7 wherein the step of providing an output indication of reliability includes: providing an indication of sufficiency of the predefined training parameters for the mapping system to respond to the input pattern.

9. A method as claimed in claim 7 wherein the step of providing an output indication of reliability includes:
   providing a quantitative indication of accuracy of the output pattern with respect to accuracy of the working nodes established by the predefined training parameters.

10. A method as claimed in claim 7 wherein the output nodes provide indications of categories which include the input pattern; and
    the step of providing an output indication of reliability includes providing an indication of sufficiency of the predefined training parameters for the mapping system to respond to the input pattern.

11. A method as claimed in claim 7 wherein the step of providing an output indication of reliability includes:
    providing a quantitative indication of error in the output pattern; and
    providing an indication when the predefined training parameters are insufficient for the mapping system to respond to the input pattern accurately.

12. A pattern mapping system comprising:
    a plurality of input nodes for providing signals defining an input pattern;
    a layer of working nodes, each working node corresponding to a different range of target patterns from training data and each working node having (a) an activation signal in response to input patterns within the corresponding range of target patterns and (b) at least one statistical signal associated with the activation signal based on the training data, the layer of working nodes coupled to the input nodes to receive the signals defining the input pattern, and in response, each working node having a corresponding range of target patterns which includes the input pattern producing a respective activation signal;
    a plurality of output nodes, each coupled to receive and sum the activation signals of the working nodes, such that the plurality of output nodes provide an output pattern indicative of the input pattern; and
    an output assembly coupled to receive the at least one statistical signal from the working nodes, and in response to the at least one statistical signal the output assembly providing at least one measure of reliability of the output pattern as a function of the training data.

13. A system as claimed in claim 12 wherein the output assembly includes:
    at least a first node for providing a measure of amount of training data involved in the ranges of target patterns of the working nodes producing activation signals in response to the input pattern, the involved training data being local to the input pattern and forming local training data; and
    a second node for providing a measure of accuracy of fit of the output pattern to the local training data.

14. A system as claimed in claim 13 wherein the first node provides an indication of insufficient training data for the system to respond to the input pattern when the measure of amount of local training data falls below a predetermined threshold.

15. A system as claimed in claim 13 wherein the first node provides an indication of training data density.

16. A system as claimed in claim 13 wherein the second node comprises a ratio node for calculating output error in the output pattern by averaging contributions of the working nodes to the output error weighted by contribution of the working node in producing the output pattern.

17. A system as claimed in claim 13 wherein the output assembly further comprises plural summing nodes coupled between the layer of working nodes and the first and second nodes, one summing node being common to the first and second nodes.

18. A system as claimed in claim 13 wherein the output assembly further comprises a maximum activation node for indicating maximum activation of the working nodes.

19. A system as claimed in claim 12 wherein the working nodes are radial basis function units having respective active signals defined according to a Gaussian density function.

* * * * *

UNITED STATES PATENT AND TRADEMARK OFFICE
CERTIFICATE OF CORRECTION

PATENT NO. : 5,335,291
DATED : August 2, 1994
INVENTOR(S) : Mark A. Kramer, James A. Leonard and Lyle H. Ungar It is certified that error appears in the above-indentified patent and that said Letters Patent is hereby corrected as shown below:

Column 19, Claim 1, line 8 before "activation" insert --(a)--.

Signed and Sealed this

Twenty-fifth Day of October, 1994

Attest:

BRUCE LEHMAN

*Attesting Officer*     *Commissioner of Patents and Trademarks*